(12) United States Patent
Kumar et al.

(10) Patent No.: US 11,546,375 B2
(45) Date of Patent: Jan. 3, 2023

(54) DETECTION OF EXTERNAL MESSAGING ATTACKS USING TRUST RELATIONSHIPS

(71) Applicant: Barracuda Networks, Inc., Campbell, CA (US)

(72) Inventors: Deepak Kumar, San Jose, CA (US); Anshu Sharma, Los Altos, CA (US)

(73) Assignee: Barracuda Networks, Inc., Campbell, CA (US)

( * ) Notice: Subject to any disclaimer, the term of this patent is extended or adjusted under 35 U.S.C. 154(b) by 318 days.

(21) Appl. No.: 16/578,630

(22) Filed: Sep. 23, 2019

(65) Prior Publication Data

US 2021/0092154 A1 Mar. 25, 2021

(51) Int. Cl.
*H04L 9/40* (2022.01)
*H04L 67/30* (2022.01)
*H04L 51/212* (2022.01)
*H04L 51/216* (2022.01)
*H04L 51/234* (2022.01)

(52) U.S. Cl.
CPC ........ *H04L 63/1483* (2013.01); *H04L 51/212* (2022.05); *H04L 51/216* (2022.05); *H04L 51/234* (2022.05); *H04L 63/1416* (2013.01); *H04L 63/1425* (2013.01); *H04L 67/30* (2013.01)

(58) Field of Classification Search
CPC ..... H04L 63/1483; H04L 51/34; H04L 67/30; H04L 63/1425; H04L 51/12; H04L 63/1416; H04L 51/16; H04L 63/0245; H04L 63/102; H04L 63/123

See application file for complete search history.

(56) References Cited

U.S. PATENT DOCUMENTS

| | | | |
|---|---|---|---|
| 8,392,357 B1* | 3/2013 | Zou | H04L 51/212 715/752 |
| 8,793,255 B1* | 7/2014 | Bilinski | G06Q 10/06393 707/740 |
| 9,686,308 B1* | 6/2017 | Srivastava | H04L 63/126 |
| 2019/0121866 A1* | 4/2019 | Garg | H04L 51/52 |
| 2020/0053111 A1* | 2/2020 | Jakobsson | H04L 63/1416 |

\* cited by examiner

*Primary Examiner* — Suraj M Joshi
*Assistant Examiner* — Jaren Means

(57) ABSTRACT

External messaging attacks are detected using trust relationships. A profile is built for each target within an organization using extracted header data from multiple prior messages. Trust scores are derived for each sender of a message for each target profile, each trust score is derived from a degree and a quantity of communication between the respective sender and the target in the extracted header data. Incoming messages are received and a target and a sender of each incoming message is determined. A trust score is retrieved for the sender from the profile of the target for each incoming message, labels are generated for each of incoming message based on the respective trust score, and the respective label is applied to be visible to the target in association with the message for each respective message.

19 Claims, 11 Drawing Sheets

DETECTION OF EXTERNAL MESSAGING ATTACKS USING TRUST RELATIONSHIPS

FIELD

The present description relates to e-mail communications and other messages and, in particular, to protecting data and data stores from external attack through e-mails.

BACKGROUND

E-mail remains the primary channel for enterprise communications. E-mail provides great convenience in that anyone can directly access almost anyone else at very low cost with a simple, and usually descriptive, address. This convenience is also its greatest liability. Phishing has become the primary approach to stealing personal data and accessing enterprise databases. Most companies are harmed by at least one successful phishing attack at least once a year.

In a typical phishing attack, an attacker sends an e-mail that impersonates a trusted person or a trusted third party. The impersonation is intended to induce the target, under false pretenses, to do something that the target would not otherwise do, such as provide a password or install a program. Social engineering is a technique to glean information from personal or social accounts and from enterprise publicity and to use that information to tailor an enterprise phish attack. A spear-phishing attack might use names, dates, or other personal information gleaned from social networks or other sources. Because e-mail provides direct access to the target, an individualized enterprise spear-phish e-mail appears more authentic, more urgent, or more personal. This increases the likelihood that the attack will be effective.

As more people use both a personal e-mail address and an enterprise e-mail address, employees are inclined to access personal e-mail addresses hosted by various cloud or ISP (Internet Service Provider) services e.g. Gmail, Hotmail, Comcast, or Yahoo! on a device that also has access to an enterprise or office network. Many personal e-mail services can be accessed on a web browser that is installed on an enterprise device. While professional e-mail addresses are often based on secured domains guided by enterprise information security policies, private e-mail can travel through a browser interface and bypass the enterprise security solutions. Therefore, the security system may be blind to phishing attacks coming from personal e-mail accounts.

One common type of phish e-mail induces the target to open a link to an attacker web page and enter personal information, such as a password, or credit card number that is then captured by the attacker. These phish e-mails impersonate an internet or banking account. Another common attack induces the target to launch a program, such as ransomware, spyware, or viruses by clicking on a link, picture or other object in the e-mail. A variety of other types of e-mail attacks are also categorized as phish attacks.

There are two primary defenses to phishing attacks. The first is a firewall between external attackers and the enterprise that captures suspicious e-mails before they reach the target. These barriers are normally considered inconvenient and unreliable. Trusted e-mails can be blocked and phishing e-mails can be allowed through the barrier. The second defense is to train users to recognize and delete the phish e-mails before interacting with them. Unfortunately, phish attacks are an asymmetrical threat. The attacker can send hundreds or thousands of different e-mails to many users at very low cost. Only one successful phish is required for the attacker to gain access to an entire enterprise. If only one internal user is untrained, busy, distracted, or mistaken, then the phish succeeds.

BRIEF DESCRIPTION OF THE DRAWING FIGURES

The appended claims set forth the features of the invention with particularity. The present invention is illustrated by way of example, and not by way of limitation, in the figures of the accompanying drawings in which like reference numerals refer to similar elements.

DETAILED DESCRIPTION

Figure 1:
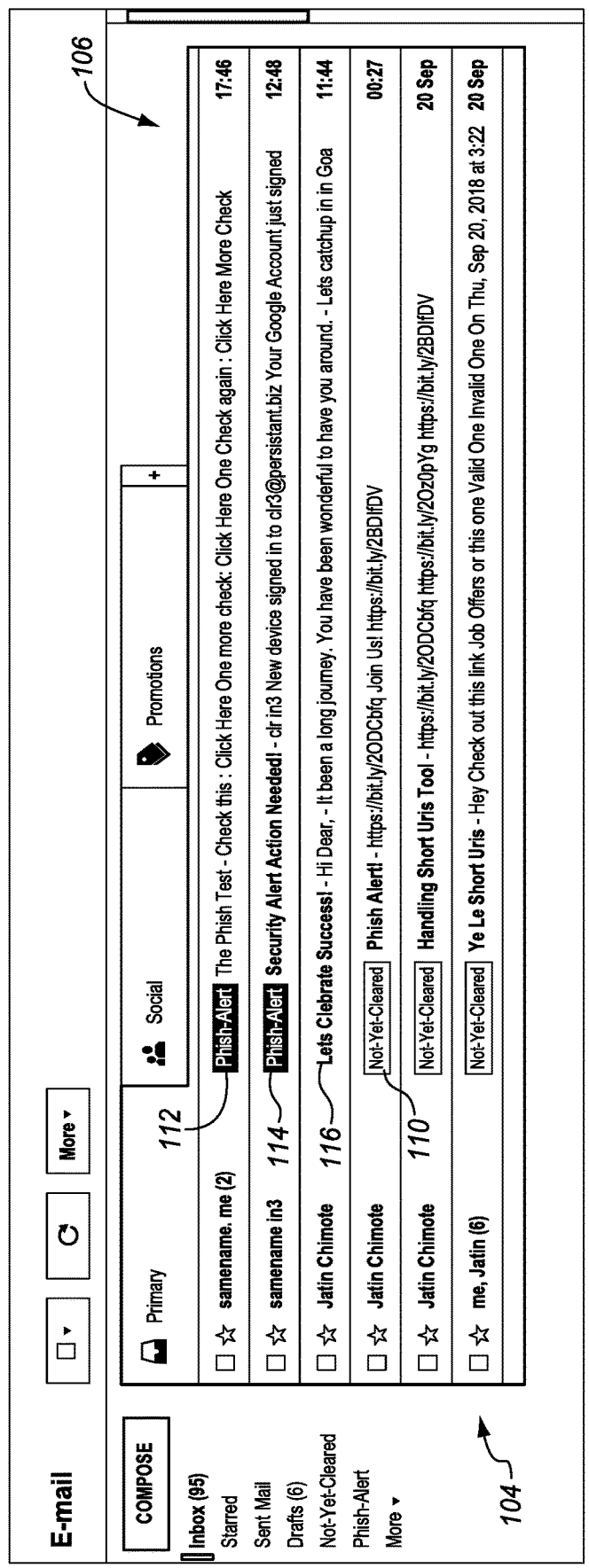
FIG. 1 is an e-mail user interface having a phish warning system in a first configuration according to embodiments.

A robust phish prevention system is described herein that can incorporate rich user engagement. An organization's social graph can be combined with a powerful machine learning algorithm to deliver an active defense that stops phish. In some examples, e-mail metadata is analyzed to map out an organization's social graph and learn about acceptable and suspicious patterns of activity. Power machine learning algorithms can be used to improve the pattern learning.

A non-intrusive interface works with users in the moment and within the familiar e-mail interface in some embodiments. Suspicious e-mail can be clearly red-flagged and moved to a specific location of the e-mail interface to give a strong visual indicator of potential threats. The e-mails are locked up before users can engage with them even if by mistake. Users can hover over any links or images to see further insight into why something is marked as being unsafe. The insights are actionable in that users can engage with the insight or with the unsafe link or image notwithstanding the risk. These and other user actions control the properties of the e-mail and also provide information back to the automated system.

E-mail attacks can be frustrated by using user interaction. An automated system can be used to detect suspicious e-mails, then the reasons for the suspicion can be identified to the user so that the user is better able to make a decision. These identifications can be provided as actionable insights to allow the user to act either to reject the e-mail or to accept the risk. The user's selections provide feedback to the system.

As described herein, rather than quarantine a suspicious e-mail and block all access or functionality, a suspicious e-mail can be locked up and then flagged or labeled to identify why it is suspicious. The labels can point to specific parts of the e-mail such as addresses or links that are suspicious. The user can then review the labels and decide whether or not to trust the e-mail.

This approach avoids the inconvenience of a barrier or quarantine that places e-mails in an inaccessible location by presenting all e-mails in the Inbox. This approach also avoids a mistake caused by a busy or distracted user because the automated system generates labels or flags that demand the user's attention. In a normal workflow, a busy user can simply ignore the labeled e-mails until later. A distracted user will have the labels or flags to draw attention to the risks.

As further described herein, the functionality of a suspicious e-mail can be locked or disabled. This can be done using a document object model to show only the top level appearance, by generating an image of the e-mail or in a variety of other ways. The locked e-mail can then be rendered for the user with appropriate labels. When the user mistakenly attempts to reply, forward, save an image, or select a link, then the locked function will be prevented. The user can then be shown an appropriate flag indicating why the e-mail is suspicious or why such an action may be harmful. At the same time, the user can view the content of the e-mail without risk of taking any harmful actions.

Described embodiments allow users to take responsibility for their actions so that the user can indicate that a seemingly suspicious e-mail is trustworthy or that a seemingly suspicious action, such as selecting a link or opening a file is not harmful. This reduces user frustration and saves user time. By labeling or flagging e-mails with actionable insights, the automated system delivers training at the time that training is relevant using the suspicious e-mail as the training example.

While the embodiments herein are primarily presented in the context of e-mail communications with one or more servers between sender and receiver, the invention is not so limited. Embodiments herein rely primarily on header data which has addresses, a subject, a date, and some other metadata. The body of the message is also used for further indicia of trustworthiness. These same principles may be applied to other messaging system and other messaging protocols that include the same or similar types of information with each message as is included in e-mail header data, including SMS (Short Message Service), MMS (Multimedia Messaging Service) or text messages, in-app messaging systems, enterprise message services, etc. The principles and techniques discussed herein may also be applied to multiple message systems so that, for example, a person who is trusted for text messages will also be trusted for e-mails.

FIG. 1 is a diagram of an e-mail user interface 102 having a phish warning system in a first configuration. This configuration shows an inbox 104 with a list of e-mails sorted according to recency 106. Any other sorting priority may be used depending on the selected preferences of the user. Each e-mail is listed with selected parts of the metadata and a portion of the text. In this example the selected metadata for display includes received time, sender, and subject. As shown, a fourth one of the e-mails is displayed with a first level phish warning flag 110 and a first and a second one of the e-mails is displayed with a second level phish warning flag 112. The first level is identified with a distinctive color, such as amber, and with an explanatory text, in this case "Not Yet Cleared," although any other suitable word or words may be used depending on the nature of the users and the user interface. The second level warning is displayed with a red flag and the word "Phish Alert."

In this example, the flag is a label as defined by Gmail®. The flag is shown as being on the left side of the subject column text. However, the flag may take any of a variety of different forms, depending on the e-mail provider and the e-mail clients. The flag may be in other locations or columns, depending on the particular e-mail user interface. In some implementations, stars, categories, folders and other devices may be used to flag an e-mail. In the present description, the term "flag" is used to refer to any of these or other visible markers that may be added to e-mail in any of a variety of different ways.

By displaying the phish warnings in the mailbox before the e-mail is used, the user is able to consider whether the e-mail should be opened or deleted before the user has had any interaction with the e-mail. Using such an early flag diminishes the risk of a successful phish attack. If the user is quickly checking for new e-mails, then the user may be inclined to skip the flagged e-mails. On the other hand, if the user is expecting an e-mail but does not see it, then the user may be inclined to go directly to the flagged e-mails. In any event the early warning promotes early caution. The third e-mail 116, in the mailbox, e.g. the inbox, does not have a flag and so has been cleared as safe. The user may desire to process these e-mails first.

The e-mail user interface may provide any of a variety of different tools for processing e-mails including sorting tools. The user may be able to sort the e-mails based on warning flags. The second level warning e-mails can be at the top, followed by the second level warnings, followed by the e-mails with no warning. This sorting allows the user to find the suspicious e-mails immediately and go directly to sorting them. Such a sorting system is beyond the sorting tools typically allowed by existing user interfaces and may require an additional column for the flags. Alternatively, an existing column, such as stars or folders may be used. In another embodiment a different tool such as a flag sorting buttons (not shown) may be used to allow sorting by flags without adding a separate flags column.

Figure 2:
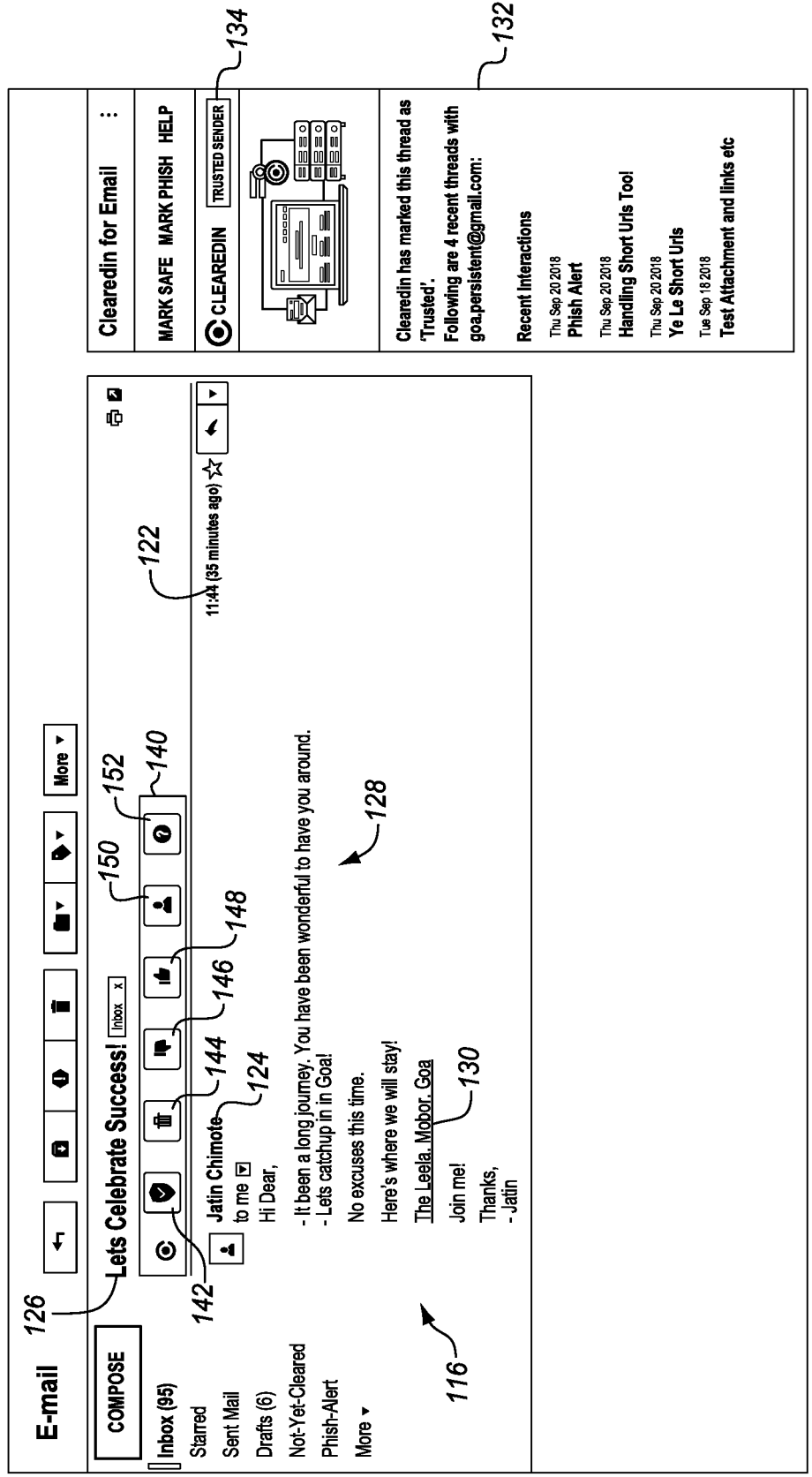
FIG. 2 is a diagram of the e-mail user interface in a second configuration to show the third e-mail after it is opened according to embodiments.

FIG. 2 is a diagram of the e-mail user interface 102 in a second configuration to show the third e-mail 116 after it is opened by the user. The opened e-mail 116 shows the normally displayed metadata, in this case the timestamp 122, sender 124, addressees (shown collapsed), and subject 126. In addition, the e-mail content 128 is shown. In this example the e-mail content includes text and a link 130. While the e-mail is not flagged in the mailbox display, it is flagged as "trusted sender" when it is opened. In an alternative configuration all e-mails are flagged including trusted ones in all mailboxes. A trusted e-mail may be flagged with a green "trusted" identifier or any other suitable indication. Using the opened e-mail display, the user is able to review the e-mail to determine if it contains any useful or important content and select any desired links. The links are all fully operational because this is not a suspicious e-mail.

In this particular e-mail user interface 102 example, there is also a special box 132 with information developed by the detection system. This information box does not contain any actionable insight but contains information about the e-mail, the trust status 134 of the e-mail and information about why it is trusted. In this example, the e-mail is trusted because the recipient has had multiple interactions with the sender and the recipient has indicated that the sender is trusted. Information is provided in the information box about these transactions. The information box may be hidden by selection of the user. The information box may be generated by a browser plug-in, an e-mail API (Application Programming Interface), by the e-mail server, or by another mechanism supported by the browser or e-mail client.

The opened e-mail includes a banner 140 with a general warning 142 about the risk level of the e-mail. The banner indicates that this e-mail is trusted, in this case with a green check mark. The banner warning helps to remind the user that the detection system is in operation and this e-mail is considered to be safe. In this example, the banner is placed between the subject and the sender of the e-mail. This helps to ensure that the user notices the banner. However, the banner may be placed in any of a variety of other location, such as between the sender and the body of the e-mail, within the body of the e-mail, or in a menu or command bar. The user is also able to perform actions within the banner based on the insight provided by the banner. These actions are each indicated with a corresponding button on the user interface. The actions include deleting, by selecting a delete button 144, disapproving by selecting a dislike button 146, approving by selecting a like button 148, requesting more information about why the e-mail is suspicious by selecting a question or help button 152, and reporting the e-mail by selecting a report button 150. The banner with the general warning and supporting general actions allows a user to quickly respond to a safe e-mail or indicate that a trusted e-mail should not be trusted. More or fewer actions may be provided within the banner, depending on the implementation. In addition, the warning may be placed in a different position from the action buttons. Many e-mail user interfaces allow buttons to be added in a ribbon, a menu, or a tab. Some of the action buttons may be moved to this location. The banner may also be generated by a browser plug-in or any of the other mechanisms mentioned above.

Figure 3:
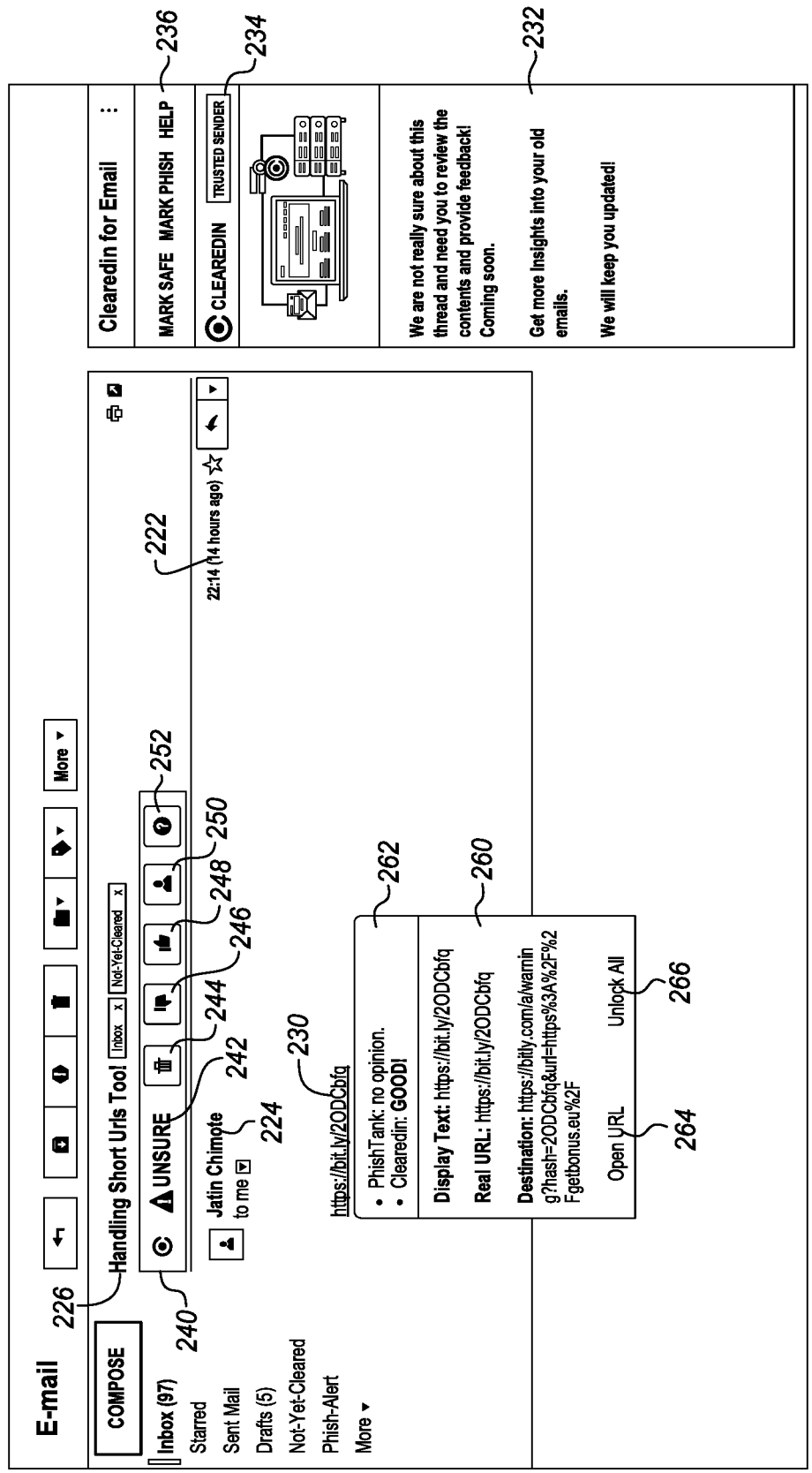
FIG. 3 is a diagram of the e-mail user interface in a third configuration to show the fourth e-mail of FIG. 1 after it is opened according to embodiments.

FIG. 3 is a diagram of the e-mail user interface 102 in a third configuration to show the fourth e-mail 110 of FIG. 1 after it is opened. The opened e-mail shows the normally displayed metadata, in this case the timestamp 222, sender 224, addressees (collapsed), and subject 226. In addition the e-mail content is shown. In this example the e-mail content includes text (obscured in this diagram) and a link 230.

The opened e-mail also includes a banner 240 similar to the banner in FIG. 2 with a general warning 242 about the risk level of the e-mail. The banner indicates that this e-mail is "unsure." This may be indicated with a yellow or amber color. The banner warning helps to remind the user that the detection system is in operation and that this e-mail presents a new situation and that caution should be used. The user is able to perform actions within the banner based on the insight provided by the banner. As in FIG. 2, these actions are each indicated with a corresponding button on the user interface. The actions include deleting, by selecting a delete button 244, disapproving by selecting a dislike button 246, approving by selecting a like button 248, requesting more information about why the e-mail is suspicious by selecting a question or help button 252, and reporting the e-mail by selecting a report button 250. The banner with the general warning and supporting general actions allows a user to quickly respond to the unsure e-mail or indicate that it should or should not be trusted.

For this e-mail, there is also a displayed information box 232 which contains further information about why the e-mail is indicated as "unsure." The information box is an example of actionable insight, in which some insight is provided and the user is provided with actions to take 236 to respond to the insights. These actions are presented in the information box as marking the e-mail as "safe" or as "phish." A help button allows the user to obtain still more information.

When the recipient takes an action, marking the e-mail as safe or phish, the detection system receives this information. For example, this e-mail does not have any suspicious content but is from an unknown sender. This is explained in the information box 232. If the recipient has indicates that this sender is trusted and then another e-mail is received from the same sender, then the detection system can mark the second e-mail as trusted as in FIG. 2. The information box for this next e-mail can indicate that the recipient trusts the sender. As explained in more detail below, such an e-mail may be subjected to further tests so that it may be indicated as phish if it contains bad links, even if it is from a trusted sender.

The e-mail is flagged 242 in the banner 240 as it is in the mailbox display. Within the displayed content, any suspicious element would also be flagged. However, this e-mail does not have any suspicious elements. Nevertheless, because the sender is unknown, the e-mail functionality is locked down until the recipient unlocks it. When the user hovers over or clicks on the one link, a risk box 260 appears. This box includes an opinion section 262 which indicates whether the link is dangerous. In this example, there are two opinions from two different services. The first service, identified as "PhishTank," has no opinion. The second service, identified as "ClearedIn" has an opinion that the link is good. The services and the opinions are optional features. More or fewer or no services may be used. The detection system can generate opinions with or without other services.

The risk box also optionally provides the actual address to which the link refers. The displayed text, the real URL (Uniform Resource Locator), and the destination for that URL are all displayed. This allows the user to compare these three. The user may be able to determine that the destination is a known or trusted destination. The user can also see whether the displayed text matches the real URL. While some browsers offer this information for any links, many e-mail browsers do not. By putting the information in the risk box it is easy and convenient for the user to access it. Finally, the risk box includes a button 264 to open the URL corresponding to the displayed real URL. Another button 266 allows the user to unlock all of the e-mail content. In this e-mail with only one link and no graphics, the effect of "unlock all" will be to unlock the link. The user must then also open the link.

The risk box is another example of actionable insight. When the user hovers over the link or tries to click on the link, then the risk box provides insight about that link. The user can then take an action based on the insight. In this case, there are three possible actions, open all, unlock all, and stop hovering. These choices can be sent to the detection system as an indication that the user considers the links to be safe and perhaps that the e-mail itself is trusted by the user. While the actions are described in the context of mouse movements, such a hovering and clicking, these are provided only as examples. Other mouse selection actions may be used instead. Any of the user actions described herein may alternatively be any of a variety of different touchscreen, gesture, voice or other actions to interact with displayed objects.

The actions taken by the detection system as shown in the e-mail interface go further than a typical firewall based phish protection system. While not visible in the diagram, the suspicious links in the e-mail have been disabled by the detection system, pending action by the user. The displayed e-mail may be an image of the e-mail or it may have specifically disabled elements using a document object model (DOM) or another software technique. As an example, a browser extension may be configured to disarm any one or more of the elements in the e-mail. In the case of an image, the image is configured based on the browser or e-mail client so that the image is rendered in line, as shown. It appears and displays just as the original e-mail would appear. In this way, if the user approves the e-mail or the link, then the e-mail is enabled. The suspicious links may be selected and the e-mail may be replied to, or forwarded. As another example, if the user disapproves the e-mail, the e-mail is not deleted. However, there is another button for deleting the e-mail. It may be useful to keep suspicious e-mails for reference purposes or other purposes. When the suspicious elements of the e-mail are disabled, then the suspicious e-mail may be preserved with a higher level of safety.

In these examples, the user is invited to make trust and distrust decisions based on the user's review of the opened e-mail or even on seeing the e-mail metadata in the inbox. These decisions are indicated by selecting appropriate buttons in the interface. The selections generate data that can be collected by the detection system to enhance the accuracy of the detections.

Figure 4:
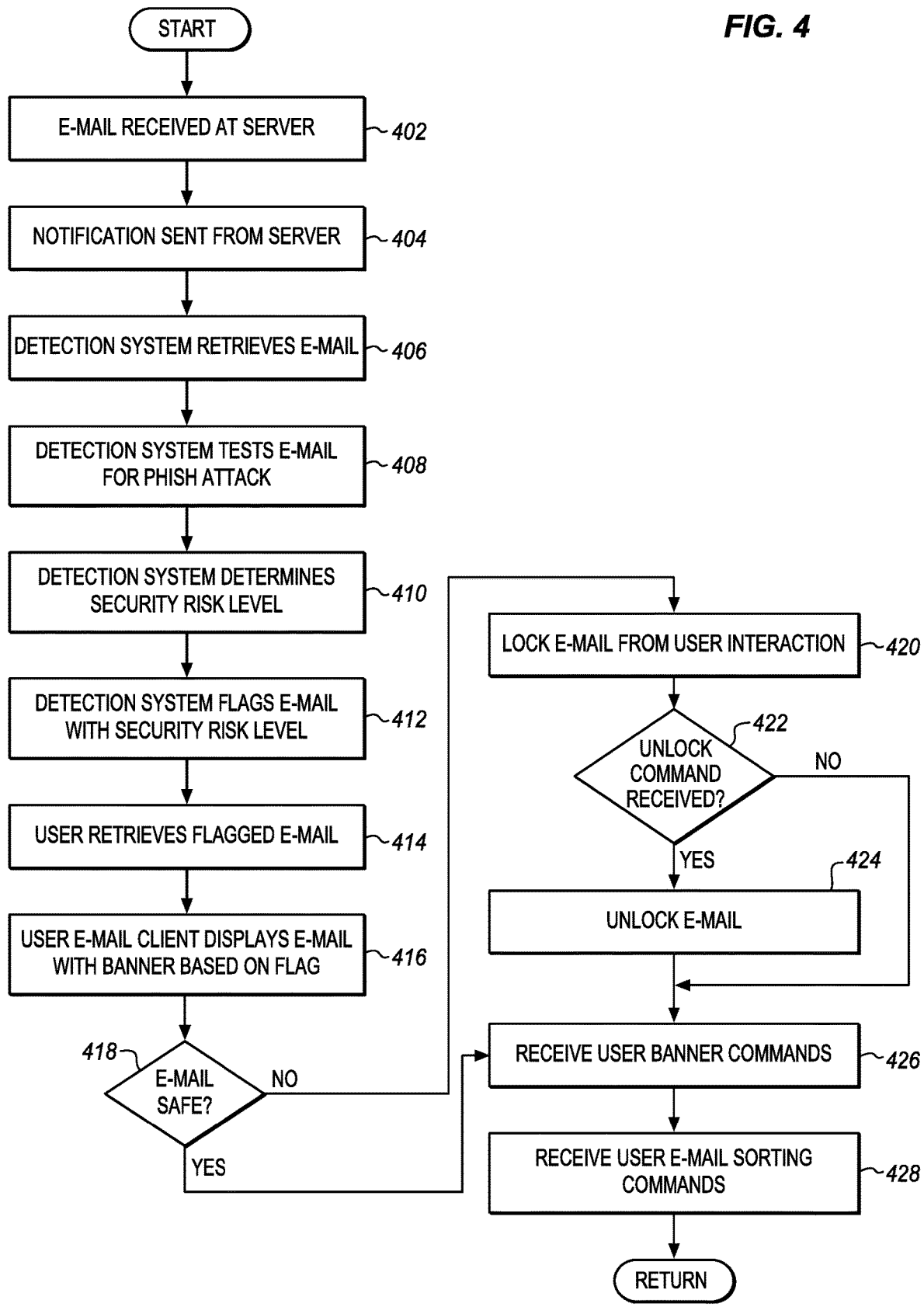
FIG. 4 is a process flow diagram of protecting users from attack according to embodiments.

FIG. 4 is a process flow diagram of protecting users from attack according to an embodiment. This process is configured to operate with a cloud service and a remote attack detection system but may be adapted to hosted e-mail and to a hosted detection system. At 402 an e-mail is received by an e-mail host or server. This is a conventional e-mail receipt and may be accompanied by any other conventional operations, depending on the e-mail configuration such as firewall operations, and receipt and confirmation operations. At 404 a notification is sent to all of the designated locations that the e-mail has arrived. This may be done using notification, alert, or subscription services that are provided by the e-mail service. In some embodiments a PubSub (Publication Subscription) API (Application Programming Interface) allows an e-mail user to designate locations, devices, or addresses that receive notifications. These may be through a push or pull process. The detection system is included among the designated locations. In other words, the detection system subscribes to the e-mail account and thereafter is notified when e-mails arrive.

At 406, the detection system retrieves the e-mail and at 408 tests the e-mail for a phish attack. Any of a variety of different tests may be used including those described above. The addresses in the metadata may be compared to a black list, a white list, a ranked list, a reputation list, or any other type of list, matrix or any other type of metadata analysis system. The content of the e-mail may be scanned or tested for executable code or program calls. The links in the e-mail may be tested against black links or redirections, etc. The detection system, based on these or other tests may then determine at 410 a threat or security risk level of the retrieved e-mail. As indicated above, there may be three levels green, yellow, and red or alert, not yet cleared, or phish. Any of a variety of other numbers of tiers and identifies and colors may be used for the various tiers of risk.

At 412 the detection system flags the e-mail at the server. In some embodiments this is done by labeling, starring, or categorizing, depending on the e-mail system. The e-mail is now associated with an appropriate security risk identification that will be presented with the e-mail when the user retrieves the e-mail. At 414 the user retrieves the flagged e-mail.

The e-mail will be displayed by the user's e-mail client with a banner and other features as shown in FIGS. 1-3 depending on how the e-mail has been flagged. In some embodiments, the e-mail client reads the flag and then modifies the e-mail to include the banner and other features. In other embodiments, the banner and other features are added at the e-mail server. The e-mail client will also check the flag to determine the security status of the e-mail at 418. The specific type of checking will depend on the tiers that are used for the security risk level. For the simple three-tier system shown in FIGS. 1-3, if the e-mail is rated as phish, then at 420, the e-mail client locks or disarms the e-mail using DOM or some other technology.

When the e-mail is locked or disarmed, the links in the locked e-mail are disabled until the user sends a command at 422 to open the link notwithstanding the security warnings. Alternatively, the user can send a command to keep the e-mail locked. The user can also send unlock or lock commands using a banner or other user interface tool. As an example, the user can mark an e-mail as spam or mark the e-mail as safe notwithstanding the warning in a banner and a flag. If the user does not unlock the e-mail, then the process continues to display the e-mail and receive marking commands at 426 and sorting commands at 428. If the user commands the e-mail or any particular suspicious element to be unlocked at 422, then the e-mail or element is unlocked at 424.

The locking and unlocking can be performed by a plug-in, an API call or other functionality at the e-mail client. Information about the user command can be sent to the detection system by the e-mail client to the detection system whether that is a remote or hosted detection system. As mentioned above, in some embodiments the e-mail is replaced with an image of the e-mail. The image may be sent to or retrieved by the e-mail client from the detection system or from the e-mail server. In order to unlock the e-mail or an element of the e-mail, the image is replaced by the original e-mail including some or all of its functionality. The original e-mail may be retrieved from the e-mail server. With the original e-mail restored, the user is able to then interact with the e-mail and any content of the e-mail.

On the other hand, if the e-mail has been rated as safe or not yet rated then the process continues at 426 to receive user commands for the displayed e-mail. At any time in the process of displaying an e-mail in the e-mail client, the user may provide user marking, e.g. banner commands. These are received 426 at the e-mail client and may be further processed in any of a variety of different ways. In some embodiments, the banner commands are sent to the detection system to provide further information or to log like, dislike, or other commands Other banner commands may be sent to a system administrator as described above. When a banner is not a part of the e-mail but is added by the e-mail client or the e-mail server, the banner may function even when the e-mail is otherwise locked.

The user may also provide any conventional e-mail sorting commands, such as delete, reply, forward, move, mark, and similar commands. When the e-mail client receives these types of commands at 428, then these may be executed using conventional methodologies. Many of these commands rely on metadata of the e-mail and so these are disabled when the e-mail is locked but are made possible if the e-mail is not locked or is later unlocked.

Figure 5:
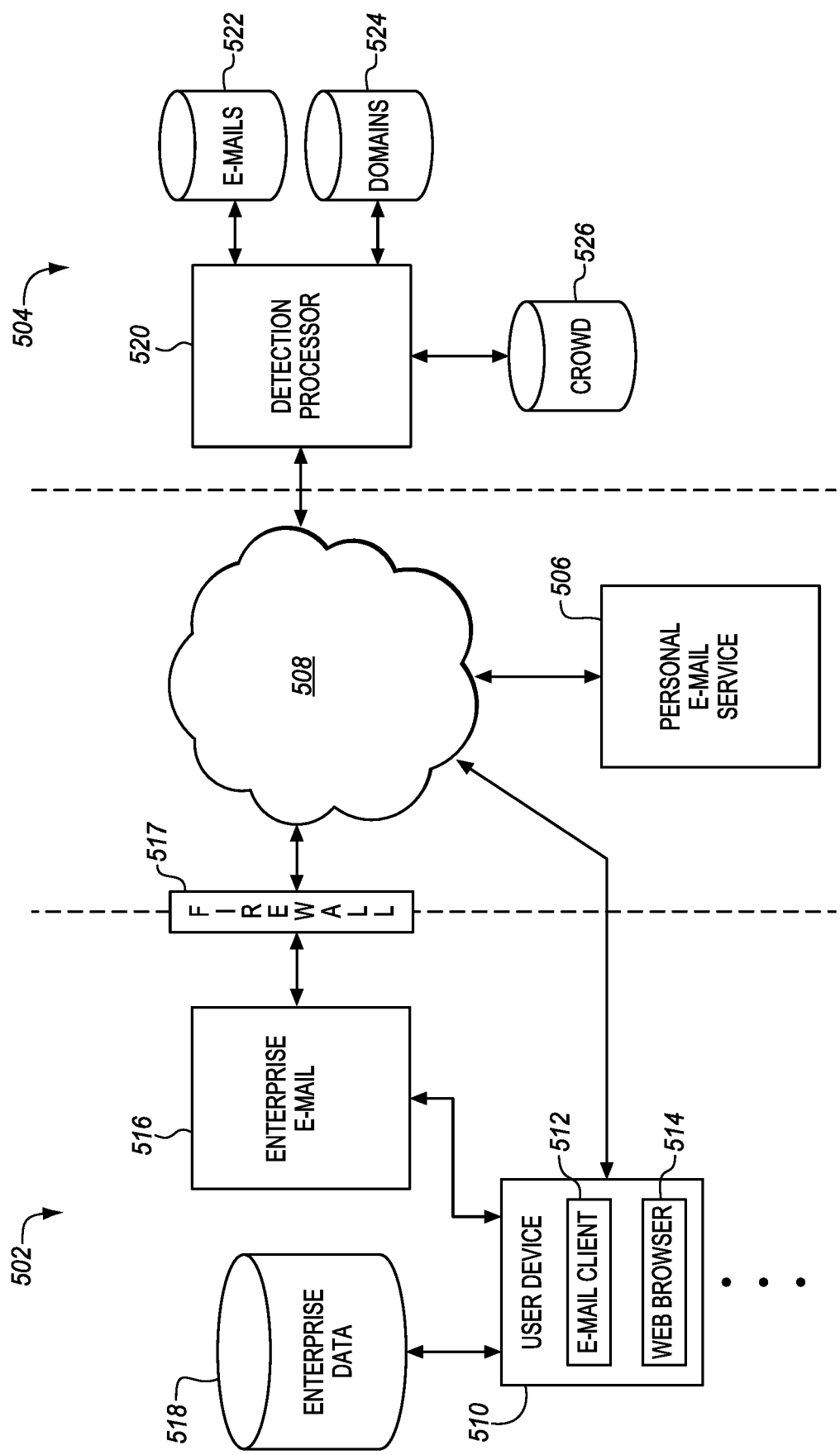
FIG. 5 is a diagram of a generalized configuration for e-mail services within an enterprise according to embodiments.

FIG. 5 is a diagram of a generalized configuration for e-mail services within an enterprise. An enterprise system 502 is protected by a firewall 517. The enterprise has an e-mail server 516 and various enterprise data resources 518 that may be exposed to external attack. A user has a user device 510 within the enterprise with an e-mail client 512 to receive e-mail service from the enterprise server. The user may also or alternatively have a web browser 514 to receive e-mail services from the Internet 508. The enterprise e-mail may also be through the web browser and the Internet e-mail may also be through an e-mail client. The enterprise may have many more functions, services, and facilities than shown, any of which may be the subject of an attack.

The user device 510 connects using the web browser through the Internet 508 to a personal e-mail service 506. In some implementations this connection may be direct without the connection of the firewall, as shown. This is particularly common when the personal e-mail is through a cellular telephone subscription. Alternatively, all traffic may be through the firewall 517. This service provides personal e-mails and perhaps other types of personal services such as news feeds, messaging, social updates, friend posts, etc. In some cases, such a personal e-mail service is also used as the enterprise e-mail service in which case, there is no enterprise e-mail server 516. Such a system may also provide other services, such as document generation, accounting services and other business-directed services.

A detection system 504 is coupled through the Internet 508 to the user device 510. The connection may be direct through the browser using e.g. a plugin or it may be through the enterprise e-mail server 516 or in another way. Alternatively, the detection system may be within the enterprise and hosted by the enterprise. The detection system has a detection processor 520 with access to an e-mail database 522, a domain database 524 and a crowd wisdom database 526. These are used by the detection processor to detect safe and phish e-mails. The databases may be structured or unstructured and may use related tables or any other storage system to store data so that it can be accessed by the detection processor.

The e-mail data 522 includes user actions to trust or not trust particular e-mails as well as threads and histories of communications. The domain database has information about various domains, such as white lists of trusted domains and black lists of unsafe domains, or any one or more other such structures. This data may be enhanced by any of a variety of trace, ping and other operations performed through the Internet to test domains and routes.

Figure 6:
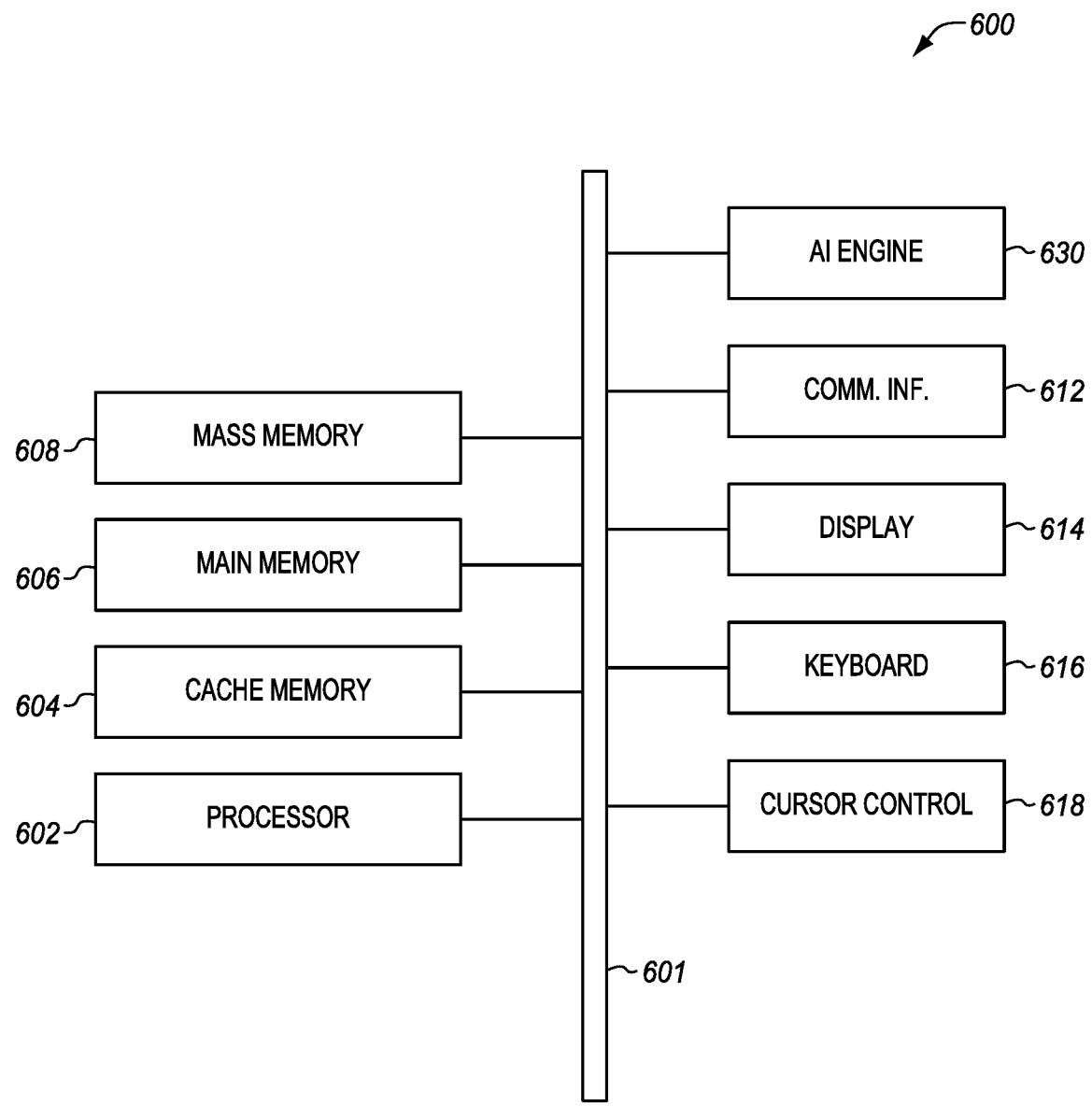
FIG. 6 is a block diagram of a computer system upon which embodiments may be implemented.

FIG. 6 is a block diagram of a computer system 600 representing an example of a system upon which features of the described embodiments may be implemented, such as the systems 506, 510, 516, 517, and 520 of FIG. 5. The computer system includes a bus or other communication means 601 for communicating information, and a processing means such as one or more microprocessors 602 coupled with the bus for processing information. The computer system further includes a cache memory 604, such as a random access memory (RAM) or other dynamic data storage device, coupled to the bus for storing information and instructions to be executed by the processor. The main memory also may be used for storing temporary variables or other intermediate information during execution of instructions by the processor. The computer system may also include a main nonvolatile memory 606, such as a read only memory (ROM) or other static data storage device coupled to the bus for storing static information and instructions for the processor.

A mass memory 608 such as a solid-state disk, magnetic disk, disk array, or optical disc and its corresponding drive may also be coupled to the bus of the computer system for storing information and instructions. The computer system can also be coupled via the bus to a display device or monitor 614 for displaying information to a user. For example, graphical and textual indications of installation status, operations status and other information may be presented to the user on the display device. Typically, an alphanumeric input device 616, such as a keyboard with alphanumeric, function and other keys, may be coupled to the bus for communicating information and command selections to the processor. A cursor control input device 618, such as a mouse, a trackball, trackpad, or cursor direction keys can be coupled to the bus for communicating direction information and command selections to the processor and to control cursor movement on the display.

A communication device 612 is also coupled to the bus. The communication device may include a wired or wireless modem, a network interface card, or other well-known interface devices, such as those used for coupling to Ethernet, token ring, cellular telephony, Wi-Fi or other types of physical attachment for purposes of providing a communication link to support a local or wide area network (LAN or WAN), for example. In this manner, the computer system may also be coupled to a number of clients or servers via one or more conventional network infrastructures, including an Intranet or the Internet, for example.

The system of FIG. 6 further includes an AI (Artificial Intelligence) engine. This may be implemented in dedicated hardware using parallel processing or in the processor 602 or using some combination of resources. The AI engine may also be external to the server system 600 and connected through a network node or some other means. The AI engine may be configured to use historical data accumulated by the server system to build a model that includes weights and criteria to apply to the selection processes. The model may be repeatedly rebuilt using the accumulated data to refine and increase accuracy.

A lesser or more equipped computer system than the example described above may be preferred for certain implementations. Therefore, the configuration of the exemplary computer system will vary from implementation to implementation depending upon numerous factors, such as price constraints, performance requirements, technological improvements, or other circumstances. The computer system may be duplicated in different locations for distributed computing. As an example, the system may use a simple pre-programmed deterministic selection model instead of an AI model and the AI engine.

Figure 7:
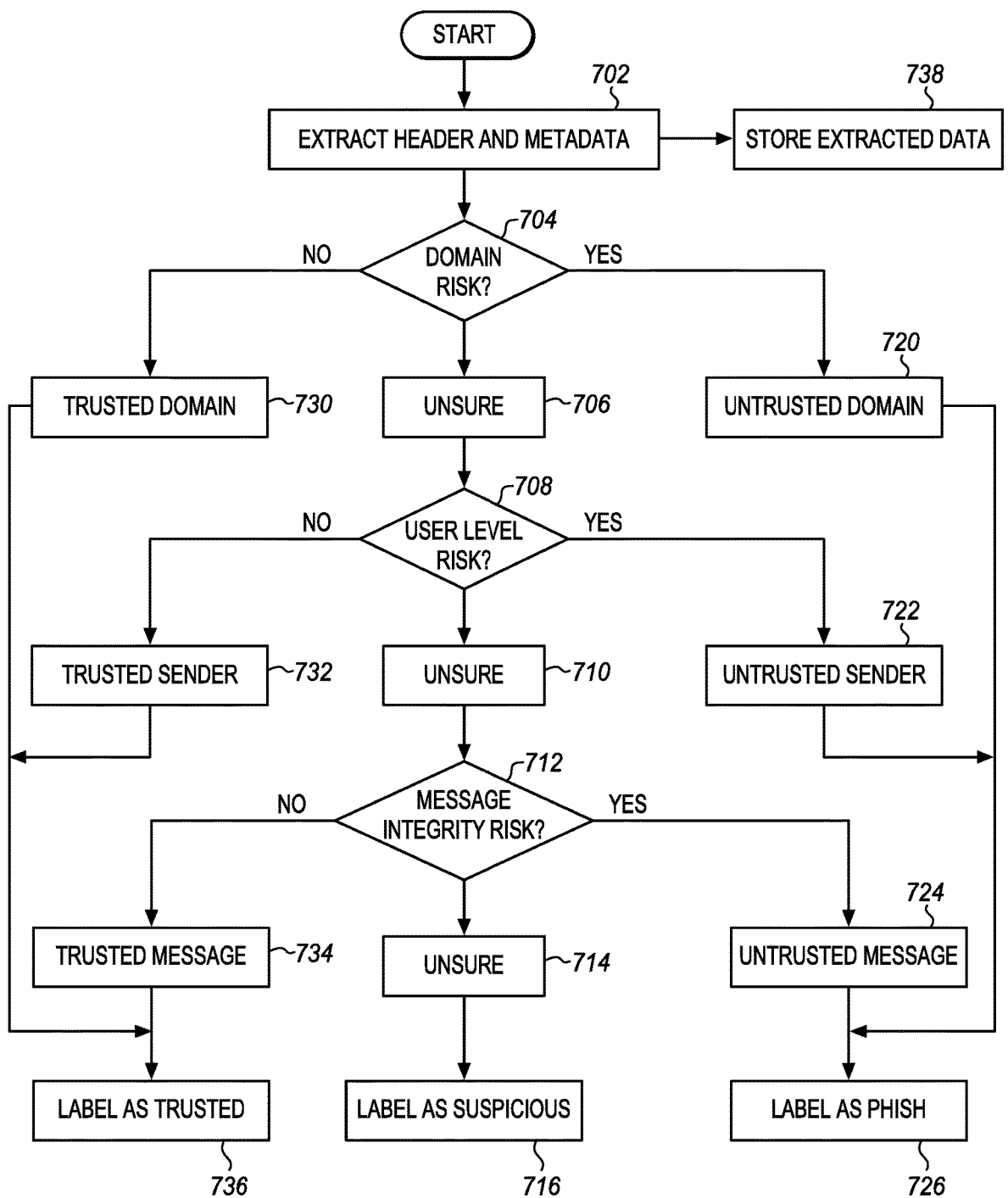
FIG. 7 is a process flow diagram of detecting suspicious e-mails at a detection system according to embodiments.

FIG. 7 is a process flow diagram of operations to test an e-mail and determine a risk level such as operations at 408, 410 in FIG. 4 that may be performed by an external or hosted detection system 504 in FIG. 5. The detection system receives e-mail in any of a variety of different ways, extracts any relevant information and then assesses each e-mail. In one example, the detection system subscribes to e-mail notifications for its users and then pulls the e-mail from an e-mail server upon receiving the corresponding notification. The detection system may pull all of the e-mail or only the metadata and header information in order to preserve privacy of the users. Alternatively, the detection system may receive e-mails through a push system in which e-mail are delivered from an e-mail server or from an intermediate component in the e-mail system. In another embodiment, the client device may have a plug-in or API that forwards all received e-mail to the detection system.

In this example, the detection system evaluation starts with extracting header data and metadata from the received e-mail at 792. The header includes address fields, date, subject and similar information. Metadata includes other information about the e-mail and its routing that is not normally shown to users in an e-mail client. Using this extracted information, the system is able to examine a variety of different risks. A first test is evaluating risks from the e-mail's sending domain at 704. The domain may be checked against white lists and black lists of known threats. The particular domain may also be queried to determine its nature. Any of a variety of different domain tests may be used. For example, if a sender is using a domain similar to a correct domain or is using an internationalized domain name (IDN) homograph attack, or is leveraging Unicode for a deceptive domain name, such techniques can be detected as unsafe. Similarly, if a sender is sending from a domain that is not a part of any trusted connections list, this is suspicious.

If the domain is known to be untrusted or bad at 720, then the e-mail can be labeled as a phish 726. On the other hand, if the domain is known to be trusted or good, such as a trusted enterprise domain, then the domain is trusted at 730 and the e-mail can be labeled as trusted at 736. If there is insufficient information to determine the risk of the e-mail based on the sending domain then at 706 the e-mail is marked as having an unsure domain.

If the domain risk is unsure, then at 708, the detection system evaluates user-level risk. This check determines whether the e-mail is from a known trusted or untrusted sender. If the user is determined to be a known bad actor or is otherwise known to be untrusted, then the e-mail is from an untrusted sender at 722 and the e-mail can be labeled as a phish 726. On the other hand if the e-mail is known to be from a trusted sender at 732, then the e-mail can be labeled as trusted at 736. If the e-mail sender is not known as trusted or untrusted then the e-mail risk is still unsure at 710.

Unsure e-mails may then be evaluated based on user level risk at 708. This evaluation is scored by evaluating relationships between users. At an initial level the user-level risk can be determined using user contacts. Any sender in a receiver's contacts can be judged as being a trusted sender. Senders can also be tested using pinging, Sender Policy Framework (SPF), Domain Keys Identified Mail (DKIM) and other tools. When the list of trusted senders is limited by contacts and certain tests, then very few e-mails are marked as safe. This can be frustrating to the individual e-mail user. These types of tests may be augmented with deeper information about trusted relationships so that fewer e-mails are rejected.

If the sender is a known or a safe sender based on these tests at 732, then the message can be labeled as trusted. If the sender is a known unsafe or untrusted sender at 722, then the message is labeled as phish. If the e-mail is neither certainly trusted nor not trusted then the e-mail can be labeled as still unsure at 710 and more tests may be applied.

Any remaining unsure e-mails may then be tested for integrity at 712. The integrity tests are message-level checks that can be performed on metadata. Any one or more of a variety of different checks may be performed. These checks might include checking SMTP (Simple Mail Transfer Protocol) headers in the e-mail, checking the IP (Internet Protocol) path and the endpoints traversed by the message, and a similarity check among others. If a significant number of the e-mail metadata, such as source and destination addresses, routing, and path parameters are suspicious, then the e-mail message may be determined to be untrusted at 724 and labeled as a phish. The similarity check similarly looks for suspicious addresses that are designed to look like legitimate addresses or path indicators. The suspicious address might use a plural when the known address is a singular word, a misspelling, or a character set that appears similar to another character set e.g. "rn" instead of "m."

Further tests can detect other suspicious behaviors, such as using a name that is similar to a name for an existing trusted sender. In other e-mails the sender may use a "reply to" e-mail address that is different from the sender e-mail address in either the header or the envelope. In other cases, the sender may add himself to a pre-existing e-mail thread. The sender may re-send a compromised link. Any of these behaviors can be detected by looking at header, path, endpoints and similar types of data.

When an e-mail with an unsure domain 706, and unsure user 710, passes all of the message-level checks, the detection system may label it as a trusted message 734 and mark it as trusted 736. Alternatively, there may be a different marking to indicate that there is no known danger, but that the system does not know that the e-mail is safe. When the message includes bad SMTP headers, suspicious routing, and deceptive similarity tricks, then the e-mail can be determined to be untrusted 724 and labeled as a phish 726. For the unsure message for which these tests are also unsure 714, then the e-mail can be labeled as suspicious at 716.

The phish message 726 can be labeled or flagged using some sort of dangerous, bad or phish indicator. In the examples above, there is a phish-alert marking in the inbox and the banner added to the e-mails. The trusted message 736 can similarly be labeled or flagged in the client e-mail system using some sort of safe, trusted, or cleared indication. These messages are not flagged in the inbox so that the user is more likely to focus on the risky e-mail, but any suitable display approach can be used. In the examples above a check mark 142 is used in a banner 140. In addition, the content can also be blocked. For the unsure message, the message is also flagged 242 in the banner 240 and the user is invited to rate the e-mail as trusted 248 or not 246 or to request help 250, 252. The e-mail client user interface is provided as examples and the level of trust can be provided in any of a variety of different ways. In this way the detection system process of FIG. 7 directly supports the e-mail client user interface described above.

For the user level risk assessment 708 additional capability may be based around profiles of individuals and of companies across any or all channels of communication, such as different e-mail accounts, messaging systems, and even social media. Business e-mails may be used as a foundation. The extracted data from each received e-mail are stored at 738 in a profile database. The business e-mail data can be used as the entire database or it can be used to update and revise existing profiles as new data is received one e-mail at a time. The received new e-mails of FIG. 7 may be received into an enterprise account, or private account. Similar processes may also be applied to messaging and chat communications.

In embodiments, profiles for individuals are built up based on trusted business employees sharing the e-mails of those whom they trust. This indicates primary members of a trusted e-mail network. This business e-mail data can then be extended to personal or free e-mail accounts. These connections are used to build a relationship graph among individuals, services, e.g. banks, insurance, healthcare, e-commerce, social-networks, etc., and companies, e.g. workplace, suppliers, vendors, partner companies. A mix of c2c (consumer-to-consumer), b2c (business-to-consumer) and b2b (business-to-business) relationships are combined to form a graph that includes many individuals in an enterprise.

The relationship graph may be used to provide a meticulous and machine-driven map of the rhythms and cadences of a person or an organization's unique communication patterns. Safe behavior patterns can be modeled and anomalous inbound emails may be flagged. Malicious inbound messages are quickly identified as anomalous and locked, protecting users from executing fraudulent transactions, divulging credentials, or unleashing malware on a network.

After the initial data is loaded and the relationship graph is built, the system may be configured to update the graph as new information is received. The system can observe how users communicate over email and other messaging, communication and chat channels. In embodiments, the platform uses machine learning and artificial intelligence to build an organizational model seeing how users communicate internally and externally. The cadence and longevity of various types of communications and the clusters of people with whom they communicate most can also be observed to more accurately identify anomalies. In this context cadence is used herein to refer to how frequently two users communicate and the amount of time that elapses between each communication. Longevity is used herein to refer to the time elapsed from the first messages between the two users. This is particularly telling when the users continue to communicate since those first messages.

A trust graph concept may be used as a basis for the user level risk assessment. As new emails and messages are directed to an organization, they can be validated against the graph structure to assess the risk profile. The graph may be configured to change over time as new communications are analyzed for a particular person or organization to create a security mesh that starts strong and gets stronger over time.

In embodiments, a graph can be generated using e-mail metadata to map the sender-recipient relationships of the e-mails within a company to present a clear understanding of who is interacting with whom and over what period of time. From the graph, a comprehensive profile of trusted relationships can be created for each user. This profile can be created using e.g. graph theory based on analyzing e-mail metadata alone. To build the graph, e-mail headers are downloaded, and farmed to find trusted connections. The same data can be used to detect suspicious and phish e-mails.

Once the graph is built, it can be continuously developed by receiving user interaction where users designate e-mails as safe or not. When there are many users, this user interaction is a form of crowd wisdom. If a new sender is marked as suspicious but multiple users indicate that the sender is safe, then the detection system can add the sender to a list of safe or trusted senders based on the wisdom of this crowd. In one embodiment, all or some selected users within an organization may be given a "trust," "like," "safe," or similar type of button on the e-mail client interface. As outside e-mails are received, the selected users can designate certain senders and these designations may be collected into a sort of crowd wisdom. If enough selected users designate a sender as trusted, then that sender is trusted for all members of the organization. Similarly, if enough selected users designate the sender as unsafe, then it can be designated as unsafe for the entire organization.

For large data sets, machine learning techniques can be used to inspect new e-mails that are sent to a user that has a profile. The new e-mail can be analyzed against a set of intelligent rules that measure deviation of the received e-mail from the current trusted relationships.

Figure 8:
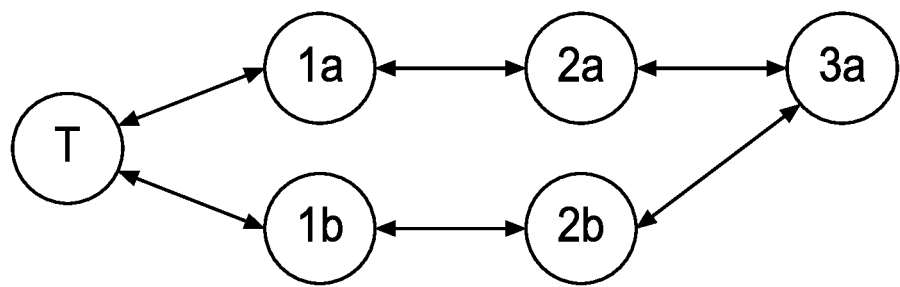
FIG. 8 is a graph of relationship degrees according to embodiments.

The relationship graph scores the relationship between the sender of the e-mail and the intended receiver of the e-mail using multiple criteria. Using the message metadata, relationships can be scored based on degree, quantity, and quality. FIG. 8 is a diagram to show differences in degree. In FIG. 8, the intended receiver of the e-mail is indicated as T for target. User T has a direct or first degree relationship with user 1a and with user 1b. This is indicated in that T exchanges e-mails with 1a and with 1b. This suggests that T trusts 1a and 1b, but the quantity and quality of the exchanges may also be considered as described below. User 1a has a first degree relationship with user 2a indicating that 1a trusts 1b. Similarly user 1b has a first degree relationship with 2b. However, T has a second degree relationship with 2a and 2b. In the same way users 2a and 2b have a first degree relationship with user 3a and T has a third degree relationship with user 3a. In a system with hundreds of related users, there may be many more than three degrees of separation between T and some of the other users in the system.

If an e-mail is received from user 1a or 1b that is directed to T, then the sender may be determined to be a trusted sender because T has trusted 1a and 1b in the past. On the other hand if an e-mail is received from 2a or 2b, T has not trusted them in the past. However, if 1a is trusted and 1a trusts 2a, then T should probably trust 2a. In the same way if 1a trusts 2a and 2a trusts 3a, then T should probably trust 3a. However with each additional degree of separation from T, the trustworthiness is reduced. The degree of separation can be used as a factor in determining whether the sender is a trustworthy sender. The degree of separation can easily be given a numerical value that is particularly well-suited to scoring the relationship between T and each user in the chain from 1a, 2a, 3a, etc.

Figure 9:
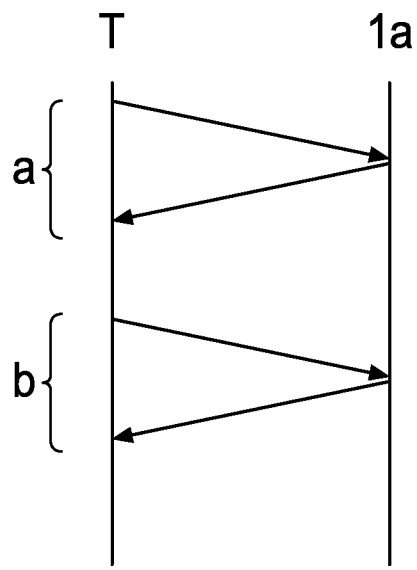
FIG. 9 is a diagram of frequency and recency in e-mail exchanges according to embodiments.

Similarly the quantity of each relationship can be scored by assessing the frequency and interactivity of the relationship. FIG. 9 is a diagram that represents two e-mail exchanges between users T and 1a. In these exchanges, T sends an e-mail to 1a and 1a sends an e-mail to T. If the second e-mail is a reply to the first, then this represents one exchange (labeled "a"). The exchange is repeated for a second exchange (labeled "b"). Such a sequence of exchanges can be scored for frequency and for proximity so that those users with which T more frequently corresponds are given a higher rating than those with which T less frequently corresponds which are given a lower score. In embodiments, only exchanges are scored. If T frequently sends e-mails to 1a, but 1a does not reply to the e-mails, then there may be no relationship. The address being used for user 1a may be wrong or there may be no relationship so that 1a does not trust T. As a result, 1a may be an untrusted sender when 1a later sends an e-mail to T that is not a reply.

Figure 10:
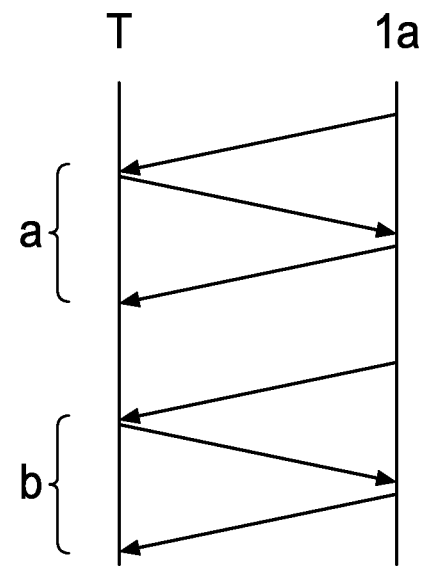
FIG. 10 is a diagram of frequency and recency in different e-mail exchanges according to embodiments.

FIG. 10 is a diagram that represents two other e-mail exchanges. In this case 1a initiates the exchanges. When T originates the exchange as in FIG. 9, then it is likely that T trusts 1a or that T believes that 1a is trustworthy. If 1a responds, then 1a probably is trustworthy. The reply also indicates that the e-mail address that T used to reach 1a is accurate. 1a is probably the user that T intended to reach. On the other hand, when 1a initiates the exchange, then there is no information about whether T considers 1a to be trustworthy. If T replies and 1a counter replies, then this three message exchange has the same indicia of real relationship that the FIG. 9 exchange has. In the illustrated example there are two three-message exchanges "a" and "b." As in FIG. 9, the frequency and proximity of the exchanges may be evaluated to further enhance the scoring of the exchanges.

When the e-mail exchange is originated by another, then there is no indication of trust from T until T responds. Otherwise, a bad actor could create trust simply by sending multiple unsolicited e-mails. However, when T responds and the sender counter responds, then the sender's address is legitimate (capable of receiving and sending) and T has indicated trust. If T replies to multiple e-mails originated by 1a then that is a stronger indication of trust.

E-mail exchanges may also be scored based on the status of the sender and receiver in the e-mail. Current e-mail protocols allow a sender to designate a receiver as "To:," as "CC:," or as "BCC:." Each of these designations suggests a different type of relationship. As an example, a receiver may be copied on an e-mail and then copied on a reply and so on, without having any particular relationship with either party except that the originator of the sequence added the copied address. This could even be done as a mistake. A BCC, on the other hand, suggests a relationship of trust from the sender, but perhaps not of mutual trust from the receiver. A further indicator is the number of users that are included in the e-mail. If T is one among a large number of other users included in an e-mail, then that suggests that the relationship between T and the other users is less trusting than if there is a one-to-one exchange.

User level checks can be performed using only the described degree and quantity indicators. The relationship score can be further improved using additional factors to indicate the quality of the e-mail interactions. These factors may include the nature of the e-mail domain being used by each party, e.g. public webmail, enterprise e-mail, personal domain, or unknown domain. The time of the exchanges, such as working hours or leisure hours, and the relative number of e-mails for the user may also be factored. In addition, the depth of e-mail-exchanges within a thread (number of e-mails with the same subject line) may be considered as an indicia of greater trust.

Figure 11:
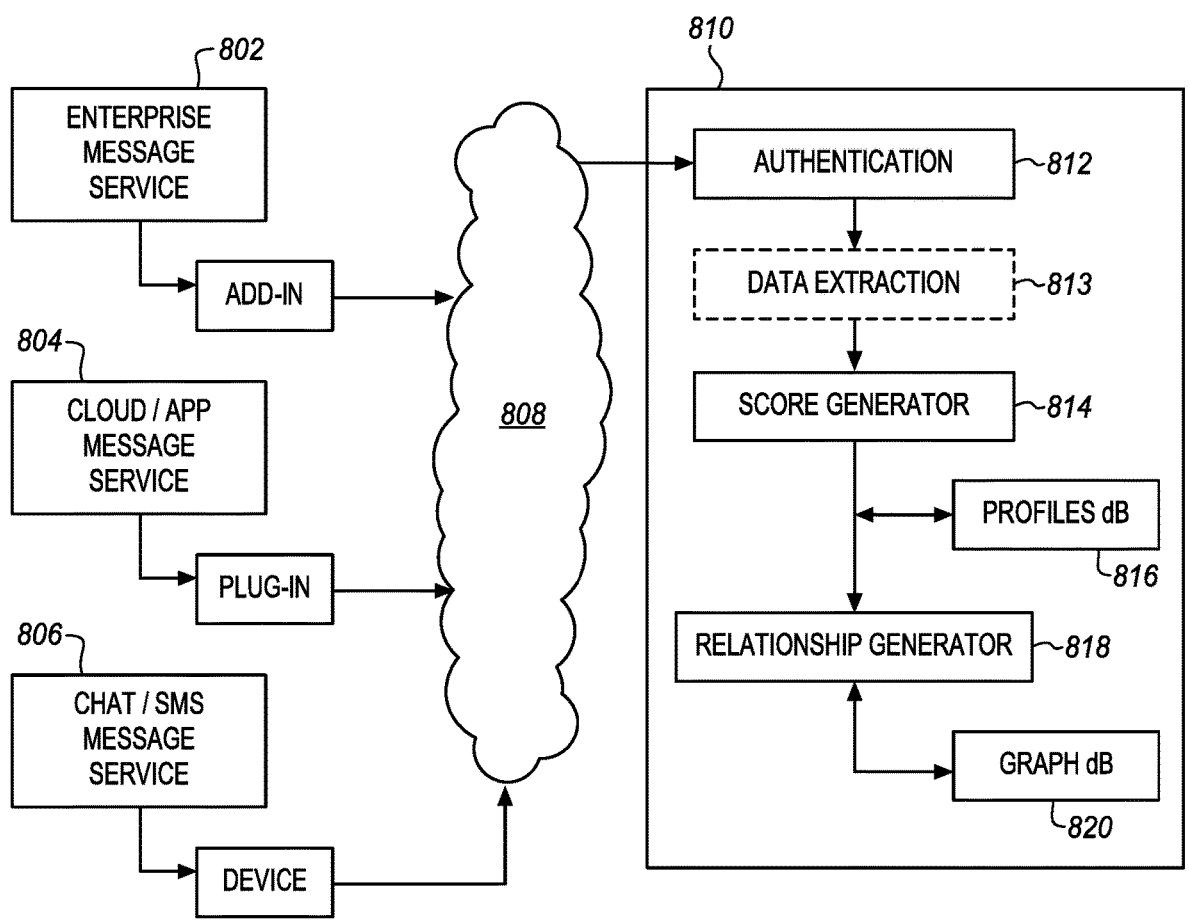
FIG. 11 is a block diagram of a system for accessing and analyzing message data to form profiles and relationship graphs according to an embodiments.

FIG. 11 is a block diagram of a system for accessing and analyzing message data to form profiles and relationship graphs. The system 810 receives data from one or more messaging systems. For an enterprise system, only enterprise message data is required, but the system may be further refined with access to other messaging external to the enterprise system. As shown, data is collected from an enterprise service 802, such as an e-mail server, internal messaging and chat system. The data may be collected from an add-in at the service, messages may simple by copied to the system, or data may be collected in any other way. Data is also collected from cloud services 804, such as free e-mail services and social network e-mail directly or through a plug-in as shown. Data may also be collected from chat or messaging services 806 that are integrated into device applications or provided by remote services. The data may be collected by the remote service or by the device, depending on the service and the system. While the present description is presented as serving an organization with an enterprise e-mail system. The same principles and techniques may be applied to any other collection of e-mail targets with or without a hosted messaging system. As an example, the organization may have no formal communications structure and all communication is through Gmail or similar types of accounts or through in-app messaging.

Data may be collected by the system 810 in any of a variety of ways. In many cases, a web browser may have a plug-in or other software tool that collects metadata from current and prior messages. This metadata may then be sent to the system 810 through the cloud 808 or a direct secure connection. As mentioned previously, the system 810 may be virtually or physically co-located within the enterprise so that the connection is direct and not through the cloud. Alternatively, an additional application on the communication device may be used to collect metadata from messages in the background. As an alternative, entire messages may be forwarded to the system 810 and then the system may extract the metadata and discard the other information.

At the system 810 the collected data is first authenticated 812 as it received. This allows the most obvious spam and spoofing messages to be eliminated from evaluation. Any suitable message authentication system or technique may be used including those described above in the context of FIG. 7. The useful data is extracted 813 from the messages. Typically, the metadata and particularly, the addresses, routing, dates, and subject information will be extracted. Other metadata may also be used and, for deeper inspections, the body of the e-mail may also be used. The data extraction engine can then build a profile for each target or addressee of an e-mail within an organization. The addressee may be the primary addressee or a copied (cc:) or blind copied (bcc:) addressee. Using the types of analysis described in the context of FIGS. 8, 9, and 10, sender trust scores may be derived and stored in the profile 816 for each target. In some embodiments, only extracted data is received in which case, no further data extraction 813 is required.

The trust scores are generated in a score generator 814 and may be derived from at least a degree of the communication and a quantity of communication between the respective sender and the target in the extracted header metadata. The degree of communication may relate to a degree of separation between the target and sender as shown, for example in FIG. 8. Senders 1a and 1b have a first degree of separation from the target T and senders 2a and 2b have a second degree of separation. The quantity of communication relates to how many messages are exchanged. Additional factors such as recency and the various other quality factors described above. The score generator 814 is able to populate the profiles 816 and also supply data to relationship generation 818.

The relationship generator builds the relationship graphs 820. A highly simplified relationship graph is shown in FIG. 8. For an organization with hundreds of targets, the graph will have hundreds of nodes and show many connections between the nodes. The relationship graph may be built using the extracted header data and the trust scores. The relationship graph indicates a relationship between a sender and a target based on prior messages between the sender and the target.

The operations of the illustrated system may be described as accessing extracted header data for all of the messages of each type. While prior messages are described here, the process continues with new messages. A profile is built for each target within an organization. Trust scores are then derived for each sender of a message. The trust scores are derived from an analysis of the criteria or factors in the extracted header data in the messages between the respective sender and the target. These may include the degree of communication, the quantity of communication, such as the number of messages, the recency of the messages, the longevity of the messages, and more. The quality of the messages may also be considered such as the filed address that is used, the number of other addressees, the number of messages in the same thread, and other factors.

With the trust scores established they may be used to score messages from the scored senders. As more messages are received by each target, the profiles may be updated using new incoming messages by extracting the header data and revising the respective trust scores.

A variety of criteria for assessing a sender are presented herein. More or fewer may be used depending on the particular implementation. These can all be included in the target profiles. Under a category of quantity, there is at least (a) a number of messages, (b) the recency of the messages, and (c) the longevity of the messaging relationship. Under a category of quality, there is at least (a) a status of the address field, such as TO, CC, etc., (b) the number of other addressees, and (c) the number of messages in a single thread of messages. These criteria will usually be different for each different combination of message target and message sender.

Figure 12:
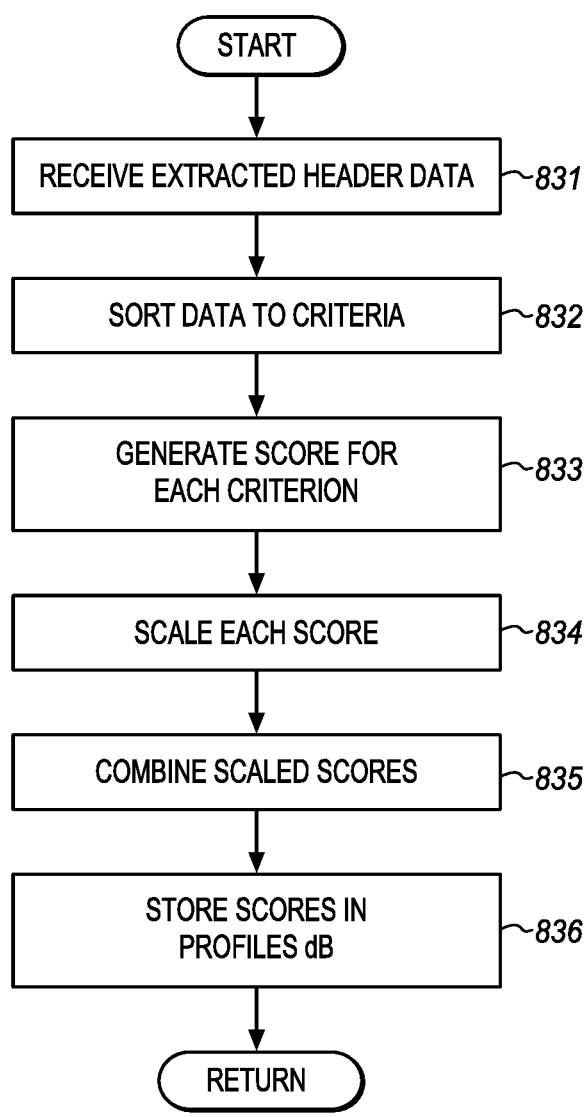
FIG. 12 is a process flow diagram for determining scores in the score generator according to embodiments.

To determine a trust score, each criterion may be given a numerical value and then scaled or normalized. FIG. 12 provides an example of a process flow for determining scores in the score generator 814. At 831, the extracted header data is received, either from a data extraction system 813 or it may be received from the sources 802, 804, 806 as extracted data. The extracted data is sorted based on the various criteria 832 described above. Scores or values are then created for each criterion at 833, such as a number of messages, a recency of messages, etc. The scores are then each scaled at 834.

The scaled values may then be added or combined in any other way at 835 to arrive at a final score for the particular sender and target connection. As an example, the number of messages may be used directly as a number that is then normalized to a value between e.g. 0 and 1. The recency of the messages may be characterized by a number of days since the last message and then normalized to a value between 0 and 1. A similar approach may be taken with all of the criteria. For these and other criteria, the numbers may also be truncated or range limited. As an example, for the number of messages, at some number of messages, trust has been established. Each additional message does not indicate significantly more trust. Messages beyond that number may be ignored.

The scores are stored at 836 in the profiles dB 816. The raw numerical values, the criteria scores and the scaled scores may all be stored. This allows the scores to easily be updated when new messages are received. The process of FIG. 12 may be performed when the system is initialized and also as new messages are received. Results are enhanced by initializing the system with a large number of prior messages from different messaging systems. However, this is not required, the system may instead be started for a particular group of users without any initialization so that scores develop only while messages are sent to the targets in the profile.

Using the trust scores, the system can approach phishing and other types of attacks in a completely different way. Rather than rely on users to decide if a sender is trusted, the trust score allows the system to look at the behavior of the user with the sender. If the target treats the sender as if the sender is trusted, for example by sending and receiving many messages with a fast cadence, then the system gives the sender a high trust score for the target and treats the sender as trusted. The system may mark the sender as trusted as well.

This use of trust scores is also different from conventional domain, black list, and integrity tests. These tests are mostly directed toward blocking certain messages based on the content or source of the message. They do not consider how users behave with respect to a sender. The trust score is based on allowing messages with senders that have been trusted.

The trust score may also be used to provide a relative value in that there may be more or less trust for a particular sender. As shown above, e-mails can be flagged as safe, unsafe, or unsure. While, in some cases a high trust score can indicate a safe message, in other cases, the trust score may not be as high. With a lower trust score, the message can be indicated as unsure. If the target of the message is sure of the sender, then the target can indicate that the message is trusted. With further message header data, the scores of some senders may be increased so that later messages are indicated as safe.

In addition to these criteria in the profiles, relationships can be used so that, for example, if a trusts b and T trusts a, then T trusts b. This second degree trust relationship concept can be extended out to several more degrees of separation and be stored in the relationship graph. The relationship graph may be used together with the trust scores in the target profiles to scale the trust relationship. In other words, and as an example, if a trusts b only a little and T trusts a only a little, then T may not trust b. On the other hand, if the trust scores are high, then the trust may be transferred so that T does trust b.

The relationship graph greatly increases the usefulness of the system. Especially for larger organizations, there will be many senders that are trusted by some targets within the organization but not trusted or known by other targets in the organization. When a message comes in, if the sender is not trusted by the target, then the system can see if the sender is trusted by another target that is close to the intended target. By using trust scores for first and higher degree users in the organization, the number of trusted senders is greatly increased. Far fewer messages will be blocked that are from trustworthy senders.

Figure 13:
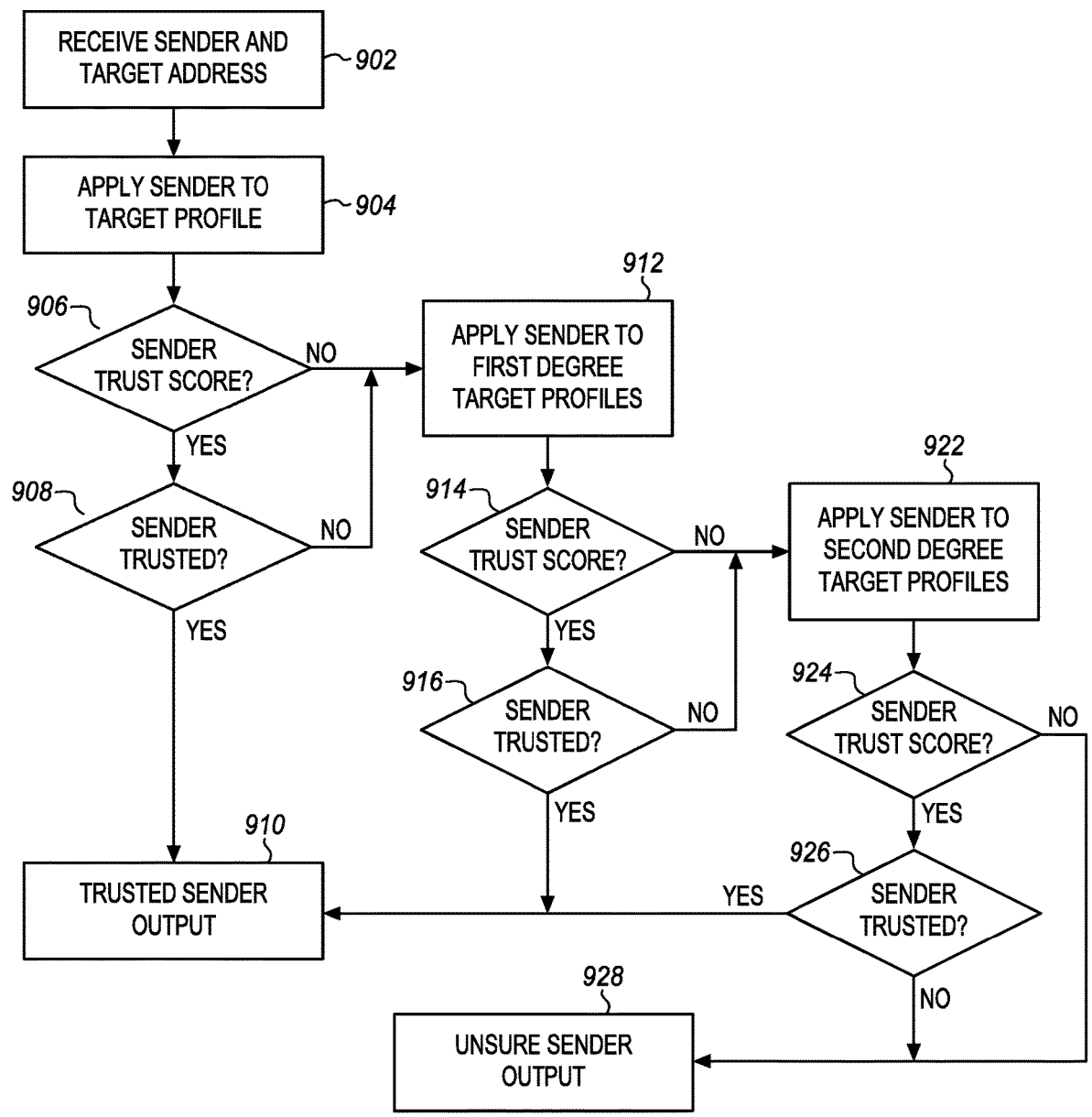
FIG. 13 is a process flow diagram of using trust scores to score e-mails according to embodiments.

The trust scores may be used alone, together with other unrelated security systems or as part of any one or more of the systems described herein. As an example, the trust scores may be used at 408 in the process flow of FIG. 4, at 708 in the process flow of FIG. 7 and performed by component 520 of FIG. 5 and component 810 of FIG. 11. The operations for using trust scores are described in the context of the process flow diagram of FIG. 13. The process flow is presented in the context of a single e-mail, but may be applied to a large number of messages of different types.

The process flow begins with receiving or accessing the sender address and the target address of the new incoming message at 902. The spelling, syntax, domain and other features of the addresses may already be analyzed as described in more detail above. If the target address or the sender address is not valid, then this process will normally be skipped or bypassed by an earlier check of the message. It has been assumed that the target address is an address of the organization. Otherwise the message is not analyzed and may not have been received. An organization in this description is described in the context of co-workers at a common domain or served by a common set of message servers, such as exchange servers. However, the invention is not so limited. The relationship graph allows an organization to be established of any desired group of users. The users may use different domains, different messaging systems, and may have any other different addresses or messaging characteristics.

In the process flow, the sender's address is applied to the profile of the target at 904. As mentioned above, the profile database has a profile for each target that includes the trust scores for that target with each possible target. There may be a few or many hundreds of senders in each profile. The process then determines whether there is a trust score for the sender in the target profile at 906. If so, then the score is analyzed to determine if the sender is trusted by the target at 908. If so, then a trusted sender output is generated at 910. This output is used in the system to mark the message and update databases as described above.

As mentioned, the score is used to determine if the sender is trusted. The score, as described above, is numerical and therefore the determination is a numerical determination, such as a level, a range deviation, or a threshold operation. In some embodiments, the score is not numerical or is a simpler positive or negative result. In some embodiments, the score is not high enough for the sender to be trusted. The system may output an intermediate level of trust or no trust. An intermediate level of trust may be indicated to the user with an alternative label, such as unsure, or caution.

In embodiments, if there is no trust score at 906 or if the trust score is not sufficiently high or does not pass a threshold or does not show that the sender is trusted at 908, then the system applies the sender to the target profiles of those who are in a trusted first degree of separation relationship with the target. This may be determined by reference to the relationship graph. For each target, the relationship graph indicates those other users of the organization with which the target communicates. The profile database indicates which of those other users are trusted by the target. This information may also be integrated into the relationship graph instead of or in addition. As compared to the target profiles, the relationship graph contains information about members of the organization however that may be defined.

Using the relationship graph, each first degree connection to the target may be accessed. If the connection is trusted, then the system at 912 applies the sender to that connection's profile. This give another trust result. If any one of the connections have a trust score at 914, then the process determines whether the sender is trusted at 916. If a trusted connection trusts the sender, then the trusted sender output is generated at 910. If no trusted connection has a trust score for the sender, then the system can look at second degree connections and similarly at fourth, fifth, and subsequent degree connections.

The second degree connections are the organization's users that are trusted by one or more of the target's trusted connection. For each of these second degree connections, the process applies the sender's address to the second degree connection's profile to find a trust score 924. If no trust scores are found for this sender, then the process can go to third degree connections or generate an unsure sender output 928. This output may be processed as described above. By continuing to third, fourth, and higher degree connections, the process may eventually check every member of the organization that is trusted by another member of the organization. However, these members may not be trusted by the target but only by those that the target trusts.

If a trust score is found with trusted second degree connection at 924, then at 926 the process determines whether the trust score indicates that the second degree connection trusts the sender. If so, then at 928 an unsure sender output is generated. If none of the second degree connections have a sufficiently high level of trust in the sender, then the process may look at higher order connections or generate the unsure sender output as shown. As the process moves further away from the target in the relationship graph to third, fourth, or higher degree connections, the trustworthiness of these more remote connections may not be as high. In order to compensate for the more remote connections, the trust scores may be factored or scaled. The scaling factor may depend on the organization and may be adjusted based on the status of the person in the organization. As an example, trust scores at the second degree may be reduced by 20%. Trust scores at the third degree may be reduced by 30%, etc.

In the overall security scheme, the system may be configured to exempt certain messages from this process. As an example, a whitelist may be maintained for known safe senders. Messages from these senders, once authenticated, may be marked as safe and trust scores may be ignored.

While the steps described herein may be performed under the control of a programmed processor, in alternative embodiments, the steps may be fully or partially implemented by any programmable or hard coded logic, such as Field Programmable Gate Arrays (FPGAs), TTL logic, or Application Specific Integrated Circuits (ASICs), for example. Additionally, the methods described herein may be performed by any combination of programmed general purpose computer components or custom hardware components. Therefore, nothing disclosed herein should be construed as limiting the present invention to a particular embodiment wherein the recited steps are performed by a specific combination of hardware components.

In the present description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. The specific detail may be supplied by one of average skill in the art as appropriate for any particular implementation.

The present description includes various steps, which may be performed by hardware components or may be embodied in machine-executable instructions, such as software or firmware instructions. The machine-executable instructions may be used to cause a general-purpose or special-purpose processor programmed with the instructions to perform the steps. Alternatively, the steps may be performed by a combination of hardware and software.

The described operations may be provided as a computer program product that may include a machine-readable medium having stored instructions thereon, which may be used to program a computer (or other machine) to perform a process according to the present invention. The machine-readable medium may include, but is not limited to optical disks, CD-ROMs, and magneto-optical disks, ROMs, RAMs, EPROMs, EEPROMs, magnet or optical cards, flash memory, or any other type of medium suitable for storing electronic instructions. Moreover, the present invention may also be downloaded as a computer program product, wherein the program may be transferred from a remote computer to a requesting computer by way of data signals embodied in a carrier wave or other machine-readable propagation medium via a communication link (e.g., a modem or network connection).

Some embodiments described herein pertain to a non-transitory machine-readable medium comprising a plurality of instructions, executed on a computing device, to facilitate the computing device to perform one or more of any of the operations described in the various embodiments herein.

Some embodiments described herein pertain to receiving an e-mail, detecting a suspicious element in the e-mail, disabling the suspicious element of the e-mail, flagging the suspicious element of the e-mail, displaying the e-mail in an e-mail user interface with the disabled element and the flag, receiving a user command to enable the disabled element of the displayed e-mail, and enabling the disabled element. Further embodiments relate a machine-readable medium, to an apparatus, and to means for performing the described functions.

Although this disclosure describes some embodiments in detail, it is to be understood that the invention is not limited to the precise embodiments described. The specification and drawings are, accordingly, to be regarded in an illustrative rather than a restrictive sense. Various adaptations, modifications and alterations may be practiced within the scope of the invention defined by the appended claims.

What is claimed is:

1. A method comprising: accessing extracted header data for a plurality of prior messages, each prior message having a sender and a target; building a profile for each target within an organization, each target being a receiver of at least one prior message of the plurality of prior messages; determining a degree of communication for the plurality of prior messages for each relationship between a respective sender and a respective target of a respective prior message within the plurality of prior messages, wherein the degree of communication relates to a degree of separation of exchanged messages between the respective sender and the target; giving a numerical value to the degree of communication for each relationship between the respective sender and the respective target; determining a quantity of communication for the plurality of prior messages for each relationship between a respective sender and a respective target of a respective prior message within the plurality of prior messages, wherein the quantity of communication relates to how many messages are exchanged between the respective sender and the target; giving a numerical value to the quantity of communication for each relationship between the respective sender and the respective target; deriving a trust score for each sender of a message within the plurality of prior messages for each target profile, each trust score being derived by combining the numerical value for the degree of communication and the numerical value for the quantity of communication between the respective sender and the target in the extracted header data; receiving a plurality of incoming messages; determining a target and a sender of each of the plurality of incoming messages; retrieving the respective trust score for the sender from the profile of the target for each respective incoming message; generating labels for each of incoming message based on the respective trust score, wherein a label associated with a suspicious incoming message points to a specific portion of the suspicious incoming message that has been identified as suspicious; and applying the respective label to be visible to the target in association with the message for each respective message, wherein the generated labels provide a user insight regarding trustworthiness of the message and reasoning for the trustworthiness of the message when the user either hovers over the generated labels or selects the generated labels.

2. The method of claim 1, wherein giving a numerical value to the degree of communication comprises giving a higher trust score for a lower degree of separation.

3. The method of claim 2, wherein the higher trust score is derived for direct messages between the target and the sender and a lower trust score is derived for the target profile for messages between a third person and the sender.

4. The method of claim 1, wherein the quantity of communication is determined at least in part by a number of messages as indicated in the extracted header data.

5. The method of claim 1, wherein the quantity of communication is determined at least in part by a recency of messages as indicated in the extracted header data.

6. The method of claim 1, wherein the quantity of communication is determined at least in part by a longevity of messages as indicated in the extracted header data.

7. The method of claim 1, wherein each trust score is further derived from a quality of the plurality of prior messages based on whether the target is in a "To" field or another field as indicated in the extracted header data.

8. The method of claim 1, wherein each trust score is further derived from a quality of the plurality of prior messages based on a number of other addressees of the plurality of prior messages as indicated in the extracted header data.

9. The method of claim 1, wherein each trust score is further derived from a quality of the messages based on a number of messages within a same thread.

10. The method of claim 1 wherein receiving the plurality of incoming messages comprises receiving the messages at a remote service.

11. The method of claim 1, further comprising generating a high trust score label for each message from a sender within the organization.

12. The method of claim 1, further comprising updating the profiles using the received plurality of incoming messages by extracting header data and revising the respective trust scores.

13. The method of claim 1, further comprising building a relationship graph using the extracted header data and the trust scores, the relationship graph indicating a relationship between a sender and a target based on prior messages between the sender and the target.

14. The method of claim 1, further comprising testing the message integrity to determine whether a sending domain and path are valid and modifying the generated label based on the message integrity.

15. The method of claim 1, further comprising disabling elements of the messages based on the trust score.

16. An apparatus comprising: a detection processor to receive extracted header data for a plurality of messages, each message having a sender and a target, to build a profile for each target within an organization, each target being a receiver of at least one of the plurality of messages, and to derive a trust score for each sender of a message within the plurality of messages for each target profile, each trust score being derived from a degree and a quantity of communication between the respective sender and the target in the extracted header data, wherein the degree of communication relates to a degree of separation of exchanged messages between the respective sender and the target, wherein the quantity of communication relates to how many messages are exchanged between the respective sender and the target, and wherein the trust score is derived by giving a numerical value to the degree of communication for each relationship between the respective sender and the respective target, giving a numerical value to the quantity of communication for each relationship between the respective sender and the respective target, and combining the respective numerical value for the degree of communication and the respective numerical value for the quantity of communication; and a database to store the extracted header data and the profiles for each target including trust scores for each sender, the detection processor further to receive a plurality of incoming messages, to determine a target and a sender of each of the plurality of incoming messages, to retrieve the respective trust score for the sender from the profile of the target for each respective message, to generate labels for each message based on the respective trust score, and to apply the respective label to be visible to the target in association with the message for each respective message, wherein the generated labels provide actionable insights associated with a reasoning for the generated labels and wherein the actionable insights provide user training, wherein the generated labels provide a user insight regarding trustworthiness of the message and reasoning for the trustworthiness of the message when the user either hovers over the generated labels or selects the generated labels.

17. The apparatus of claim 16, further comprising:
a crowd wisdom database having records of target feedback regarding messages received by the respective target from senders and wherein the detection processor is further to scale the trust score using the crowd wisdom database.

18. A non-transitory machine-readable medium having instructions stored thereon that, when operated on by one or more processors, causes the machine to perform operations comprising:
   accessing extracted header data for a plurality of prior messages, each message having a sender and a target;
   building a profile for each target within an organization, each target being a receiver of at least one of the plurality of messages;
   determining a degree of communication for the plurality of messages for each relationship between a respective sender and a respective target of a respective message within the plurality of messages, wherein the degree of communication relates to a degree of separation of exchanged messages between the respective sender and the target;
   giving a numerical value to the degree of communication for each relationship between the respective sender and the respective target;
   determining a quantity of communication for the plurality of messages for each relationship between a respective sender and a respective target of a respective message within the plurality of messages, wherein the quantity of communication relates to how many messages are exchanged between the respective sender and the target;
   giving a numerical value to the quantity of communication for each relationship between the respective sender and the respective target;
   deriving a trust score for each sender of a message within the plurality of messages for each target profile, each trust score being derived by combining the numerical value for the degree of communication and the numerical value for the quantity of communication between the respective sender and the target in the extracted header data;
   receiving a plurality of incoming messages;
   determining a target and a sender of each of the plurality of incoming messages;
   retrieving the respective trust score for the sender from the profile of the target for each respective incoming message;
   generating labels for each of incoming message based on the respective trust score; and
   applying the respective label to be visible to the target in association with the message for each respective message, wherein the generated labels provide a user insight regarding trustworthiness of the message and reasoning for the trustworthiness of the message when the user either hovers over the generated labels or selects the generated labels.

19. The medium of claim 18, the operations further comprising extracting the header data from the plurality of messages.

* * * * *